(12) United States Patent
Mukasa

(10) Patent No.: US 8,554,038 B2
(45) Date of Patent: Oct. 8, 2013

(54) MANUFACTURING METHOD OF PHOTONIC BAND GAP FIBER AND PHOTONIC BAND GAP FIBER

(75) Inventor: Kazunori Mukasa, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 118 days.

(21) Appl. No.: 12/980,857

(22) Filed: Dec. 29, 2010

(65) Prior Publication Data

US 2011/0188824 A1   Aug. 4, 2011

(30) Foreign Application Priority Data

Jan. 29, 2010  (JP) ................. 2010-018904

(51) Int. Cl.
    *G02B 6/02*   (2006.01)
(52) U.S. Cl.
    USPC ............... 385/125; 385/123; 385/124
(58) Field of Classification Search
    None
    See application file for complete search history.

(56) References Cited

U.S. PATENT DOCUMENTS

| | | | |
|---|---|---|---|
| 7,054,524 B2* | 5/2006 | Miller | 385/28 |
| 7,082,235 B2* | 7/2006 | Gunn, III | 385/28 |
| 7,406,239 B2* | 7/2008 | Ouderkirk et al. | 385/131 |
| 7,668,428 B2 | 2/2010 | Miyabe et al. | |
| 7,693,378 B2 | 4/2010 | Mukasa | |
| 7,693,380 B2 | 4/2010 | Mukasa | |
| 7,738,763 B2* | 6/2010 | Ouderkirk et al. | 385/141 |
| 7,805,040 B2 | 9/2010 | Mukasa | |
| 7,853,111 B2* | 12/2010 | Noda et al. | 385/129 |
| 7,881,579 B2 | 2/2011 | Mukasa | |
| 7,903,919 B2 | 3/2011 | Mukasa | |
| 2002/0061176 A1* | 5/2002 | Libori et al. | 385/125 |
| 2005/0069269 A1* | 3/2005 | Libori et al. | 385/125 |
| 2006/0213230 A1* | 9/2006 | Miyabe et al. | 65/409 |
| 2007/0172188 A1* | 7/2007 | Noda et al. | 385/130 |
| 2008/0219667 A1 | 9/2008 | Imamura | |

(Continued)

FOREIGN PATENT DOCUMENTS

| | | |
|---|---|---|
| JP | 2001-215351 A | 8/2001 |
| JP | 2004-238246 A | 8/2004 |

(Continued)

OTHER PUBLICATIONS

U.S. Appl. No. 12/938,104, filed Nov. 2, 2010, Takahashi, et al.

(Continued)

*Primary Examiner* — Kaveh Kianni

(74) *Attorney, Agent, or Firm* — Oblon, Spivak, McClelland, Maier & Neustadt, L.L.P.

(57) ABSTRACT

A manufacturing method of a photonic band gap fiber which includes measuring a hole diameter $d_0$ and a distance-between-holes $\Lambda_0$ in a preliminary experiment capillary body by first drawing a preliminary experiment preform, calculating a confinement loss to a normalized wavelength $\lambda/\Lambda$ being a wavelength $\lambda$ normalized by an optional distance-between-holes $\Lambda$ using a ratio $d_0/\Lambda_0$ and the optional distance-between-holes $\Lambda$ as design parameters, setting a distance-between-holes by calculating the set distance-between-holes $\Lambda_1$ to a desired transmission wavelength $\lambda_1$ of a photonic band gap fiber to be manufactured using a value of the normalized wavelength $\lambda/\Lambda$ in which the confinement loss becomes about a minimum value, and second drawing a preform for a photonic band gap fiber by using the same members as those of the preliminary experiment preform and by setting a distance-between-holes to the set distance-between-holes $\Lambda_1$, in a drawing temperature condition used for the first drawing.

12 Claims, 9 Drawing Sheets

(56) References Cited

U.S. PATENT DOCUMENTS

| | | |
|---|---|---|
| 2008/0310806 A1 | 12/2008 | Mukasa |
| 2009/0052853 A1 | 2/2009 | Mukasa et al. |
| 2009/0180746 A1 | 7/2009 | Mukasa |
| 2010/0135628 A1 | 6/2010 | Mukasa |
| 2010/0150507 A1 | 6/2010 | Takahashi et al. |
| 2011/0026890 A1 | 2/2011 | Takahashi et al. |
| 2012/0141078 A1 | 6/2012 | Mukasa et al. |

FOREIGN PATENT DOCUMENTS

| | | |
|---|---|---|
| JP | 2005-22945 A | 1/2005 |
| JP | 2009-139419 A | 6/2009 |
| JP | 2010-14893 A | 1/2010 |
| WO | WO 01/57567 A1 | 8/2001 |
| WO | WO 2009/040902 A1 | 4/2009 |

OTHER PUBLICATIONS

U.S. Appl. No. 12/893,304, filed Sep. 29, 2010, Mukasa.

M.D. Nielsen et al., "Singlemode photonic crystal fibre with effective area of 600 μm² and low bending loss," Electronic Letters, vol. 39, No. 25, Dec. 11, 2003, pp. 1802-1803.

Kunimasa Saitoh et al., "Leakage loss and group velocity dispersion in air-core photonic bandgap fibers," Optics Express, vol. 11, No. 23, Nov. 17, 2003, pp. 3100-3109.

Kazunori Mukasa et al., "A study on PBGF's for DWDM transmission," The Institute of Electronics, Information and Communication Engineers, 2007, 2 pages (with Partial English Translation).

M.N. Petrovich et al., "Robustly single mode hollow core photonic bandgap fiber," OFC/NFOEC, 2008, 3 pages.

Office Action issued on Mar. 19, 2013, in Japanese Patent Application No. 2010-018904 with English translation.

* cited by examiner

MANUFACTURING METHOD OF PHOTONIC BAND GAP FIBER AND PHOTONIC BAND GAP FIBER

CROSS-REFERENCE TO RELATED APPLICATION

This application is based upon and claims the benefit of priority from the prior Japanese Patent Application No. 2010-018904, filed on Jan. 29, 2010; the entire contents of which are incorporated herein by reference.

BACKGROUND OF THE INVENTION

1. Field of the Invention

The invention relates to a manufacturing method of a photonic band gap fiber and the photonic band gap fiber.

2. Description of the Related Art

A Holey fiber (HF) or a photonic crystal fiber (PCF) is a new type optical fiber that realizes an optical transmission using a principle of total internal reflection by lowering an average refractive index of a cladding portion by regularly disposing holes on the cladding portion around a core portion. It is expected that the HF makes a core diameter of the core portion large thereby to increase an effective core area (Aeff) so that the HF is applied as a low optical nonlinear transmission medium for an optical telecommunication and a fiber laser. In particular, when an ultra large Aeff whose characteristics are difficult to control through a conventional solid type fiber is intended to be realized, it is effective to control the characteristics by employing a structure of the HF. For example, M. D. Nielsen, et al., Electron. Letters, Vol. 39, No. 25, PP1802-1803, 2003 (hereinafter to be referred to as Nielsen) discloses a technology for increasing the Aeff to 600 mm² using the HF.

However, in the HF, when it is intended to realize a low optical nonlinearity by increasing the Aeff, a problem arises in that bending loss characteristics, which are one of important factors of optical fiber characteristics, are outstandingly deteriorated. For example, Nielsen describes that a transmission loss of the HF increases in a wavelength of 1550 nm even if the HF is wound around a bobbin with a relatively large bending diameter of 80 mm. Further, the HF has characteristics that a bending loss increases when the HF is used in a wavelength band of 1.0 µm or less, to which attention is paid regarding the use of the HF for the fiber laser and the like.

In contrast, a photonic band-gap fiber (PBGF) is an optical fiber of a type that realizes an optical transmission by disposing holes on a cladding portion so as to form a photonic crystal, thereby forming a photonic band-gap by a two-dimensional Bragg reflection in a wavelength of light to be transmitted, and introducing a core portion to the photonic crystal as a crystal defect. For example, K. Saitoh, et al., OPTICS EXPRESS, Vol. 11, No. 23, 2003, pp 3100-3109 (hereinafter to be referred to as Saitoh) discloses an air-core type photonic band gap fiber that can realize a low bending loss by very strong light-confinement while realizing an ultra low nonlinearity by increasing an Aeff. Further, Saitoh discloses a calculation method of optimally designing a profile parameter of a photonic band-gap fiber in detail.

SUMMARY OF THE INVENTION

It is an object of the present invention to at least partially solve the problems in the conventional technology.

In accordance with one aspect of the present invention, a manufacturing method of a photonic band gap fiber having a core portion and a cladding portion formed around an outer periphery of the core portion and having holes disposed to form photonic crystal which causes the core portion to act as a crystal defect, the manufacturing method comprising: measuring a hole diameter $d_0$ and a distance-between-holes $\Lambda_0$ realized in a preliminary experiment capillary body which is manufactured by first drawing a preliminary experiment preform having a plurality of holes formed along a longitudinal direction; calculating a confinement loss to a normalized wavelength $\lambda/\Lambda$ which is obtained based on a wavelength $\lambda$ normalized by an optional distance-between-holes $\Lambda$ using a ratio $d_0/\Lambda_0$ of the hole diameter $d_0$ and the distance-between-holes $\Lambda_0$ of the measured preliminary experiment capillary body and the optional distance-between-holes $\Lambda$ as design parameters; setting a distance-between-holes by calculating the set distance-between-holes $\Lambda_1$ with respect to a desired transmission wavelength $\lambda_1$ of a photonic band gap fiber to be manufactured using a value of the normalized wavelength $\lambda/\Lambda$ in which the calculated confinement loss becomes about a minimum value; and second drawing a preform for a photonic band gap fiber manufactured by using the same members as those of the preliminary experiment preform and by setting a distance-between-holes of the preform to the set distance-between-holes $\Lambda_1$, in a drawing temperature condition used for the first drawing of the preliminary experiment preform.

In accordance with another aspect of the present invention, a photonic band gap fiber comprising: a core portion; and a cladding portion formed around an outer periphery of the core portion and having holes disposed to form photonic crystal which causes the core portion to act as a crystal defect, the photonic band gap fiber being manufactured by the manufacturing method including measuring a hole diameter $d_0$ and a distance-between-holes $\Lambda_0$ realized in a preliminary experiment capillary body which is manufactured by first drawing a preliminary experiment preform having a plurality of holes formed along a longitudinal direction, calculating a confinement loss to a normalized wavelength $\lambda/\Lambda$ which is obtained based on a wavelength $\lambda$ normalized by an optional distance-between-holes $\Lambda$ using a ratio $d_0/\Lambda_0$ of the hole diameter $d_0$ and the distance-between-holes $\Lambda_0$ of the measured preliminary experiment capillary body and the optional distance-between-holes $\Lambda$ as design parameters, setting a distance-between-holes by calculating the set distance-between-holes $\Lambda_1$ with respect to a desired transmission wavelength $\lambda_1$ of the photonic band gap fiber to be manufactured using a value of the normalized wavelength $\lambda/\Lambda$ in which the calculated confinement loss becomes about a minimum value, and second drawing a preform for a photonic band gap fiber manufactured by using the same members as those of the preliminary experiment preform and by setting a distance-between-holes of the preform to the set distance-between-holes $\Lambda_1$, in a drawing temperature condition used for the first drawing of the preliminary experiment preform, wherein a core diameter of the core portion is twice or thrice a distance-between-holes of the holes, a ratio of a hole diameter of the holes and the distance-between-holes is 0.9 or more, and number of hole layers are 5 or more.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE PREFERRED EMBODIMENT

Figure 1:
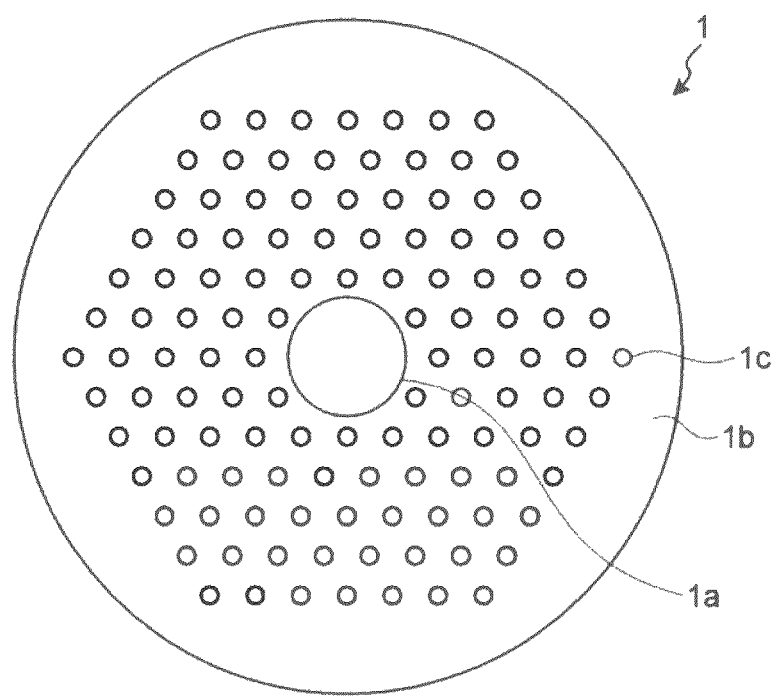
FIG. 1 is a schematic sectional view of an example of a photonic band gap fiber manufactured by a manufacturing method according to an embodiment.

A manufacturing method of a photonic band gap fiber and an embodiment of a photonic band gap fiber according to the invention will be explained below in detail referring to the drawings.

When a photonic band gap fiber is manufactured so as to obtain profile parameters (design parameters), which is determined by a calculation to realize predetermined optical characteristics, a problem arises in that optical characteristics of the manufactured photonic band-gap fiber may be different from a designed value. There is also a problem in that a degree of the difference is different depending on a material and a manufacturing apparatus used to manufacture the photonic band-gap fiber. Further, since the calculation of the design parameters includes a calculation for forming a photonic band-gap, a very long calculation time and a very large calculation load are required. Accordingly, when the design parameters are set by feeding back the optical characteristics of the manufactured photonic band-gap fiber to overcome the difference between the design values described above and actual optical characteristics, a problem arises in that a manufacturing efficiency is lowered.

Embodiment

In the following description, first, a structure of the photonic band gap fiber manufactured by the manufacturing method according to the embodiment will be explained and then the manufacturing method according to the embodiment will be explained. The photonic band gap fiber is appropriately abbreviated as a PBGF in the following description.

FIG. 1 is a schematic sectional view of an example of the photonic band gap fiber manufactured by the manufacturing method according to the embodiment. As shown in FIG. 1, a PBGF 1 includes a core portion 1a composed of a hole and a cladding portion 1b formed around an outer periphery of the core portion 1a. The cladding portion 1b has holes 1c disposed regularly. The cladding portion 1b is composed of, for example, silica-based glass, in particular, pure silica glass which does not contain a dopant for adjusting a refractive index.

In the PBGF 1 the holes 1c are disposed in a triangular lattice pattern to form a photonic crystal for forming a photonic band gap in a desired wavelength as well as a region, in which one hole 1c in a central portion of the triangular lattice and 6 holes 1c around the one hole 1c are to be disposed, is replaced with a hole acting as the core portion 1a as a crystal defect. The PBGF 1 strongly confines light in the core portion 1a by the structure and transmits the light. Note that a PBGF that has a structure in which the region of the seven holes is replaced with the core portion, may be called a 7-cell type PBGF. Further, a PBGF that has a structure in which a region of the 12 holes around seven holes, that is, a region of 19 holes in total is replaced with the core portion, may be called a 19-cell type PBGF.

In the PBGF 1 shown in FIG. 1, the number of hexagonal layers formed by the holes 1c that surround the core portion (hereinafter, called the number of the hole layers) 1a is 5. Further, when a diameter of the holes 1c (hereinafter, called a hole diameter) is denoted by d, and a distance between centers of adjacent holes 1c (hereinafter, called a distance-between-holes) is denoted by $\Lambda$, $d/\Lambda$ is set to, for example, 0.97 which is equal to or larger than 0.9. Note that, as disclosed in Saitoh, it is preferable to set the number of the hole layers to 5 or more and to set $d/\Lambda$ to 0.9 or more because a confinement loss is lowered. Note that in the 7-cell type PBGF, a core diameter is $2\Lambda$ which is twice the distance-between-holes. Further, in the 19-cell type PBGF, the core diameter is about $3\Lambda$.

Figure 2:
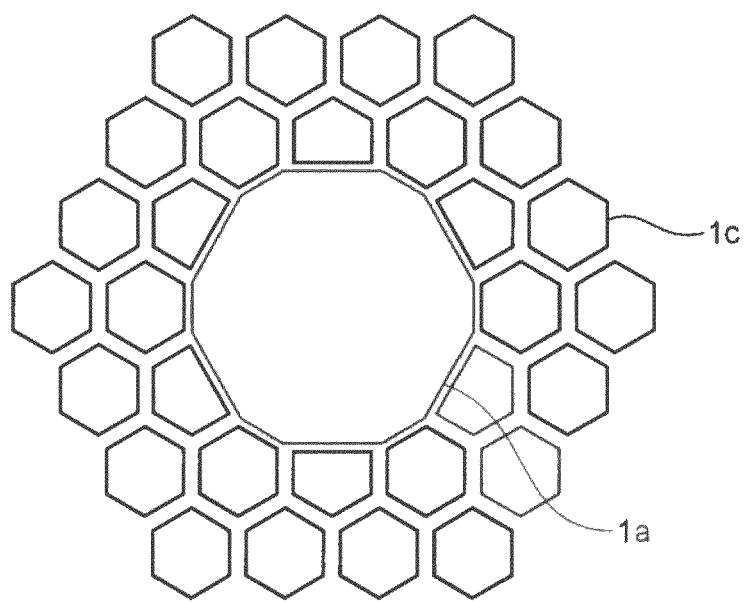
FIG. 2 is a view showing a detailed structure in the vicinity of a core portion of the photonic band gap fiber shown in FIG. 1.
Figure 3:
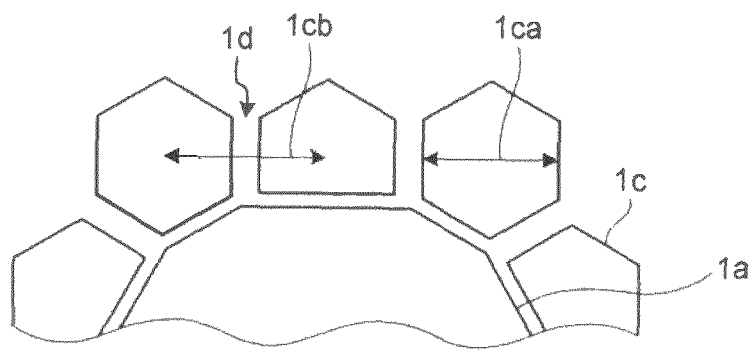
FIG. 3 is an explanatory view explaining a hole diameter and a distance-between-holes.

Next, a detailed structure in the vicinity of the core portion 1a will be explained. FIG. 2 is a view showing the detailed structure in the vicinity of the core portion 1a of the PBGF 1 shown in FIG. 1. Further, FIG. 3 is an explanatory view explaining the hole diameter 1ca and the distance-between-holes 1cb. As shown in FIG. 2, it is known that when $d/\Lambda$ has a large value of 0.9 or more as in the PBGF 1, shapes of the core portion 1a and the holes 1c are largely offset from an ideal circular shape and have a structure actually near to a hexagon as shown in FIG. 1. In particular, the holes 1c nearest to the core portion 1a have a characteristic shape influenced by a shape of the core portion 1a. Specifically, the holes 1c nearest to the core portion 1a form a structure in which 12 hexagons and pentagons are alternately disposed and spaced by a glass wall 1d.

In the case, the hole diameter 1ca of the holes 1c can be defined as a diameter of an approximate circle which is obtained when a shape of the holes 1c is approximated by a circle having the same sectional area as the holes 1c. Further, the distance-between-holes 1cb can be defined as a distance between centers of gravity of hexagonal shapes of the holes 1c. Note that, when adjacent holes 1c have a shape of a pentagon, it is possible to replace the pentagon with a hexagon whose side has the same length as that of the pentagon and to use a center of gravity of the hexagon for defining the distance-between-holes 1cb.

Figure 4:
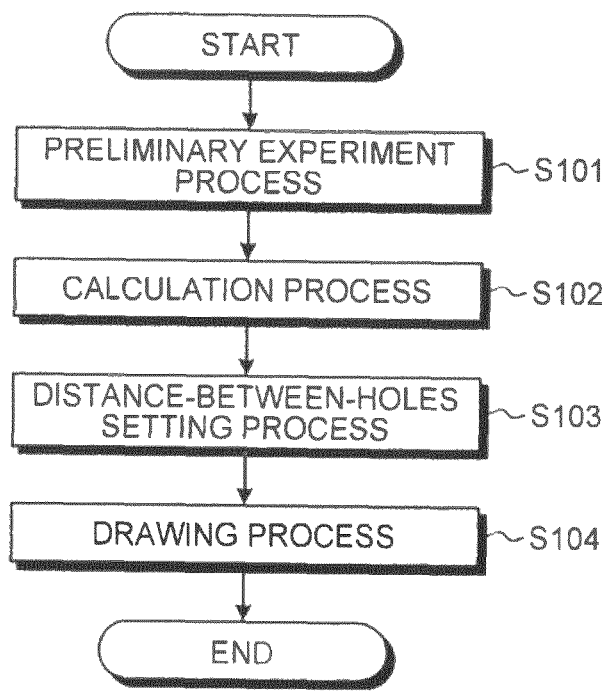
FIG. 4 is a flowchart of the manufacturing method of the photonic band gap fiber according to the embodiment.

Next, a manufacturing method of the PBGF according to the embodiment will be explained. FIG. 4 is a flowchart of the manufacturing method of the PBGF according to the embodiment. As shown in FIG. 4, the manufacturing method of the PBGF according to the embodiment includes a preliminary experiment process (step S101), a calculation process (step S102), a distance-between-holes setting process (step S103), and a drawing process (step S104).

Since the manufacturing method according to the embodiment performs a preliminary experiment at step S101, calculates a confinement loss of a PBGF at step S102 using a practical design parameter obtained by the preliminary experiment, sets a distance-between-holes of a PBGF to be manufactured at step S103 based on a result of the calculation, and draws the PBGF at step S104 so that the set distance-between-holes is achieved, the PBGF having desired optical characteristics can be more securely and more efficiently manufactured.

Each of the processes will be explained below.

Preliminary Experiment Process

First, the preliminary experiment process at step S101 will be explained. In the preliminary experiment process, first, a preliminary experiment preform having a simple structure is manufactured using a stack & draw method (a method of manufacturing a preform by bundling thin glass tubes called capillary tubes in a jacket tube and drawing the preform). Then, information as to a ratio $d_0/\Lambda_0$ of a hole diameter $d_0$ and a distance-between-holes $\Lambda_0$, which is a practical design parameter that can be realized under a condition to which an actual manufacturing condition is reflected, and information as to a feature of a hole structure is obtained by manufacturing a preliminary experiment capillary body by drawing (first drawing) the preliminary experiment preform.

Figure 5:
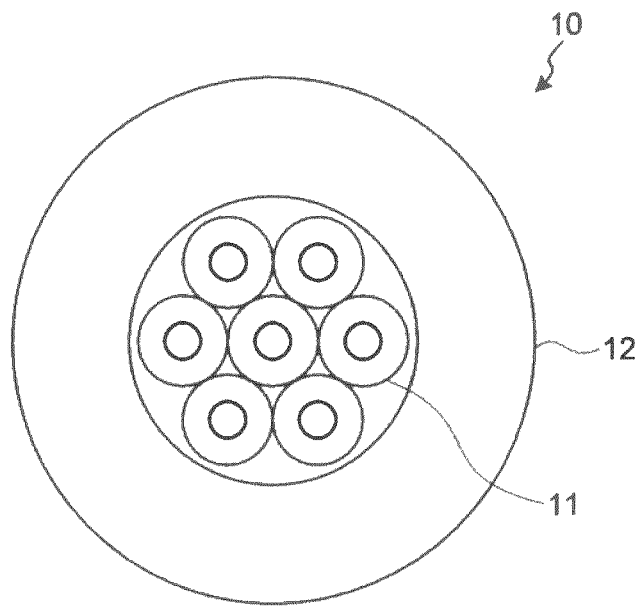
FIG. 5 is schematic sectional view of a preliminary experiment preform.

The preliminary experiment process will be specifically explained. First, a preliminary experiment preform 10 is manufactured. FIG. 5 is a schematic sectional view of a preliminary experiment preform 10 to be manufactured. As shown in FIG. 5, seven capillary tubes 11 which are hollow glass tubes are bundled in a triangular lattice pattern and disposed in a jacket tube 12 to manufacture the preliminary experiment preform 10. In the preliminary experiment preform 10, holes of capillary tubes 11 act as holes of the experiment capillary body after it is drawn. In the embodiment, when the capillary tubes 11 are disposed in the triangular lattice pattern, a ratio of an inside diameter of a hole and a distance between adjacent holes is set to 0.85. Note that it is preferable to use capillary tubes having a thin wall thickness so that the ratio is set to 0.65 or more. When the ratio is 0.65 or more, it is easy to set $d/\Lambda$ of a PBGF, which is drawn in the subsequent drawing process, to a preferable value of 0.9 or more. Note that it is more preferable to set the ratio to 0.95 or less because, when the PBGF is drawn, deformation inside the PBGF does not become large.

Figure 6:
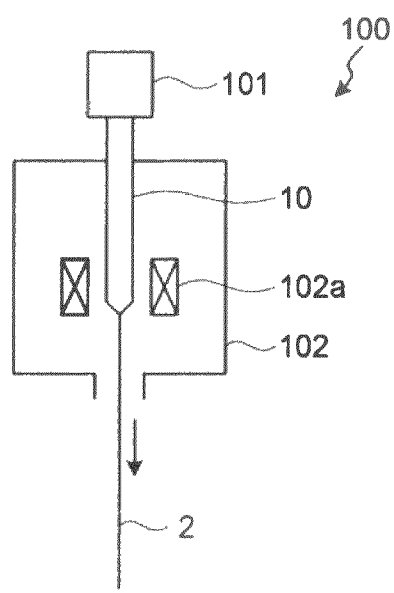
FIG. 6 is an explanatory view explaining a method of drawing the preliminary experiment preform.

Next, the preliminary experiment preform 10 is drawn. FIG. 6 is an explanatory view explaining a method of drawing the preliminary experiment preform 10. Specifically, the preliminary experiment preform 10 whose lower end is melted, collapsed, and sealed, is disposed in a drawing furnace 102 of a drawing equipment 100 shown in FIG. 6. Then, a gas pressurizing equipment 101 is connected to an upper end, which is not melted, of the preliminary experiment preform 10.

Next, the lower end of the preliminary experiment preform 10 is heated and melted by a heater 102a, and the preliminary experiment capillary body 2 is drawn. In the drawing, insides of the holes of the capillary tubes 11 are pressurized by the gas pressurizing equipment 101 to enlarge the holes. Note that, in the PBGF, since a larger ratio $d/\Lambda$ permits the photonic band gap to be formed more easily, it is preferable to set conditions such as a pressure, a drawing speed, and the like so as to enlarge the hole diameter as much as possible to obtain the ratio $d_0/\Lambda_0$ as large as possible. In particular, when the drawing equipment to be used and a wall thickness of the capillary tubes are set to the same condition, it is preferable to increase the ratio $d_0/\Lambda_0$ to a limit. Hereinafter, a ratio when the hole diameter is increased to a limit is called a limit ratio $d_0/\Lambda_0$.

Figure 7:
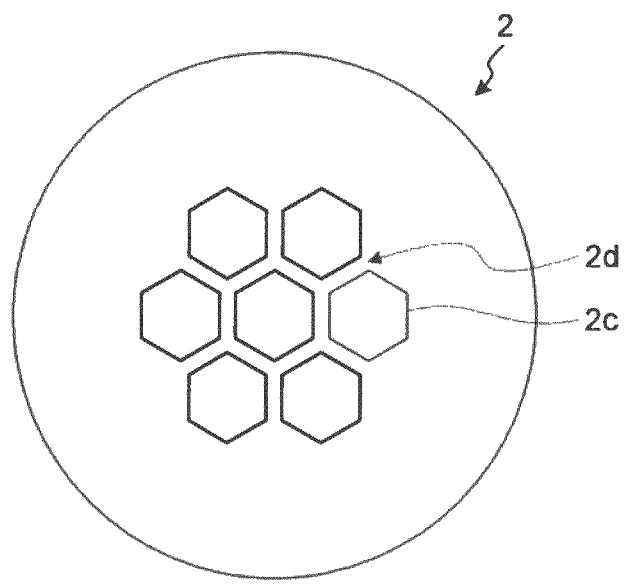
FIG. 7 is a schematic sectional view of a preliminary experiment capillary body.

FIG. 7 is a schematic sectional view of the preliminary experiment capillary body 2 which is drawn. As shown in FIG. 7, the preliminary experiment capillary body 2 has a structure in which it has holes 2c, which are spaced by a glass wall 2d, in the inside of the glass capillary body. Further, since a hole diameter of the holes 2c is enlarged as much as possible, a shape of the holes 2c is made near to a hexagon. Next, a cross section of the drawn preliminary experiment capillary body 2 is measured, and the ratio $d_0/\Lambda_0$, which is the ratio of the hole diameter $d_0$ and the distance-between-holes $\Lambda_0$ as the practical design parameter is obtained; in particular, the limit ratio $d_0/\Lambda_0$ is obtained.

Figure 8:
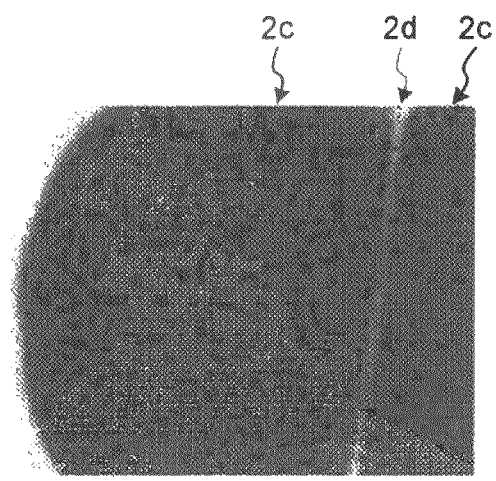
FIG. 8 is a view showing an enlarged photograph partly in cross section of an example of an actually drawn preliminary experiment capillary body.

FIG. 8 is a view showing an enlarged photograph partly in cross section of an example of the preliminary experiment capillary body actually drawn using a preliminary experiment preform having a structure shown in FIG. 5. As shown in FIG. 8, the holes 2c are separated by the very thin glass wall 2d, and it is confirmed in the example shown in FIG. 8 that the ratio $d_0/\Lambda_0$ can be increased up to about 0.97 at a portion where the ratio is a largest value. Further, when a mode of deformation of the holes from a circular shape is examined, it is confirmed that although a shape of the holes is made near to a hexagon, they are made to a shape having round corners.

Note that a preliminary experiment preform used in the preliminary experiment process is not limited to that shown in FIG. 5. When, for example, more detailed information nearer to a PBGF to be manufactured is required to obtain as to a structural feature such as a shape of the holes and a value of $d/\Lambda$, it is preferable to manufacture the preliminary experiment preform using a larger number of capillary tubes.

Figure 9:
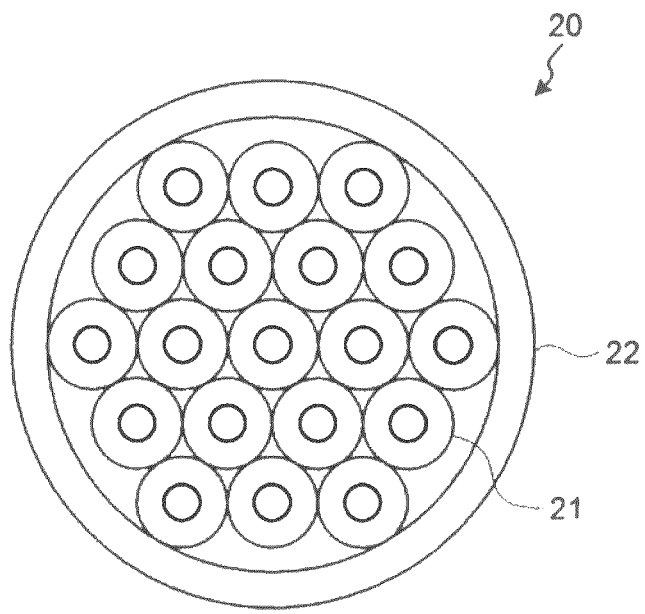
FIG. 9 is a schematic sectional view of an example of another preliminary experiment preform.

FIG. 9 is a schematic sectional view of another example of the preliminary experiment preform. A preliminary experiment preform 20 shown in FIG. 9 is manufactured by disposing 19 capillary tubes 21 in a jacket tube 22 in a triangular lattice pattern. As described above, when the preliminary experiment preform 20 is manufactured using the many capillary tubes 21, information of a more detailed structural feature can be obtained.

In this case, when a hole diameter of actually measured polygonal holes is defined by a diameter of an approximate circle as described above, and the defined hole diameter is used as the hole diameter $d_0$ at the position, and further a distance between centers of gravity of adjacent hexagonal holes is used as the distance-between-holes $\Lambda_0$, a structural feature of the holes can be included in the design parameter.

Note that a preliminary experiment preform having a structure of FIG. 9 was manufactured using the same capillary tubes as those of the preliminary experiment preform shown in FIG. 5 and the capillary tubes were drawn using the same drawing equipment as that shown in FIG. 6, it was confirmed in the drawn preliminary experiment capillary body that the ratio $d_0/\Lambda_0$ can be increased also up to about 0.97 similarly to a case of FIG. 8.

Figure 10:
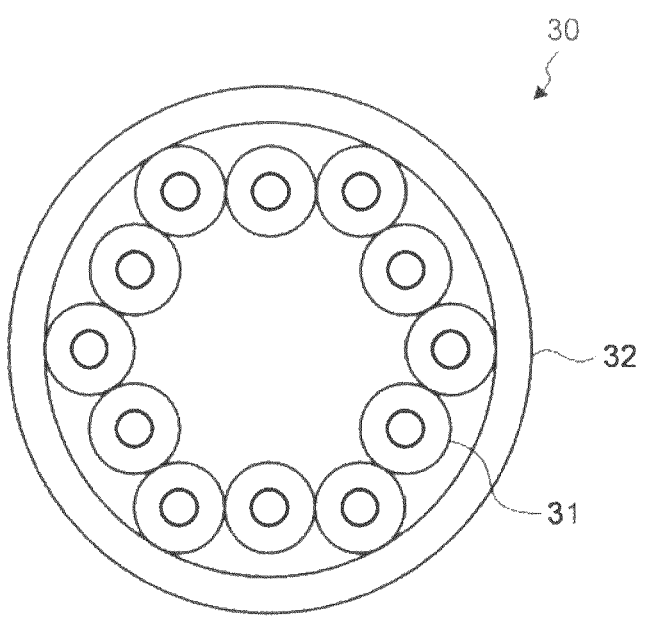
FIG. 10 is a schematic sectional view of an example of a still another preliminary experiment preform.

Further, FIG. 10 is a schematic sectional view of still another example of the preliminary experiment preform. A preliminary experiment preform 30 shown in FIG. 10 is formed with a space corresponding to the core portion 1a in the PBGF 1 of FIG. 1. The space is formed by extracting seven capillary tubes 31 in a central portion from a disposition of capillary tubes 31 disposed in a jacket tube 32 in a triangular lattice pattern. As described above, when the preliminary experiment preform 30 is manufactured by forming the space corresponding to the core portion, information of a more detailed structural feature that reflects an existence of the core portion can be obtained.

Note that when the preliminary experiment preform is manufactured using a larger number of capillary tubes, structure information of the holes is obtained in more detailed. However, when the number of the capillary tubes is excessively large, a difference between the preliminary experiment preform and a preform used for a PBGF to be actually manufactured disappears and thus a convenience of performing the preliminary experiment using the preform having the simple structure is lost. Accordingly, it is preferable that the number of capillary tubes used to the preliminary experiment preform is smaller than the number of capillary tubes used in a preform used to actually manufacture a PBGF. Further, a structure in which two layers of capillary tubes are disposed around a capillary tube in a central portion as shown in FIG. 9, is defined as a two-layered structure, a preliminary experiment is preferably performed using a preliminary experiment preform having a structure of four layers or less.

Calculation Process

Next, the calculation process at step S102 will be explained. In the calculation process, a confinement loss to a wavelength $\lambda$, in a structure of a PBGF to be manufactured is calculated using the ratio $d_0/\Lambda_0$ and, in particular, the limit ratio $d_0/\Lambda$, which are a practical design parameter obtained in the preliminary experiment process at step S101 and using an optionally selected distance-between-holes $\Lambda$. Further, the wavelength $\lambda$, is normalized by being divided by the distance-between-holes $\Lambda$, and a confinement loss to the normalized wavelength $\lambda/\Lambda$ is calculated. As the calculation, a simulation calculation by, for example, a finite element method (FEM) and the like can be used.

Figure 11:
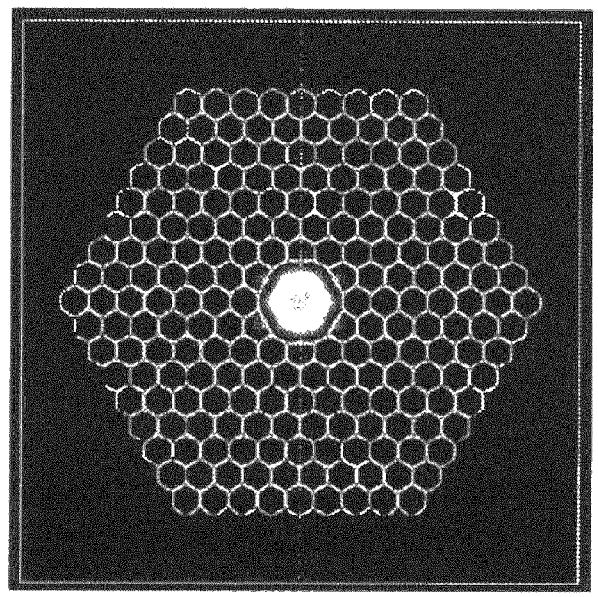
FIG. 11 is a view showing an example of a calculated field distribution of a photonic band gap fiber.

The calculation process will be specifically explained below. First, the confinement loss to the wavelength $\lambda$ is calculated. FIG. 11 is a view showing an example of a calculated field distribution of a PBGF. Note that, in FIG. 11, the simulation calculation is performed by the FEM, and the design parameters and the structure are set as described below. First, the ratio $d_0/\Lambda_0$ is set to 0.97 obtained in the preliminary experiment process. Further, the optional distance-between-holes $\Lambda$ is set to 4.05 µm. It is reported in K. Mukasa, et al, The Institute of Electronics, Information and Communication Engineers 2007, General Assembly C-3-52 that the value of 4.05 µm permits formation of a photonic band gap in a wavelength of 1.55 µm used in an optical communication. Further, the core portion is set to the 7-cell type by which a single mode operation can be more easily obtained as reported also in M. N. Petrovich et al., OFC2008, OThR4. Further, as to the holes, the structural feature obtained by the preliminary experiment process is included in the design parameters. Specifically, the core portion is formed in a hexagon in which respective apex portions are rounded. As holes just around an outer periphery of the core portion, hexagons and pentagons having respective apex portions formed in a round shape are alternately disposed in total of 12 pieces. Further, as to holes around an outer periphery of the hexagons and the pentagons, hexagons having respective apex portions formed in a round shape are disposed, and seven layers of holes are disposed around an outer periphery of the core portion. Then, a diameter of an approximate circle is set to holes of the respective shapes as a hole diameter, and a distance between centers of gravity of adjacent holes in a hexagonal or pentagonal shape is set as a distance-between-holes.

As shown in FIG. 11, in the PBGF which is calculated by being set to the structure, almost all of the light field is confined to a core portion at a center of the PBGF. Further, it is confirmed that the confinement loss to the wavelength $\lambda$ also has a low value at the wavelength of 1.55 µm and that a photonic band gap is formed.

Next, in the confinement loss to the wavelength $\lambda$ obtained by the calculation, the wavelength $\lambda$ is normalized by being divided by an optional distance-between-holes $\Lambda$, and a confinement loss to the normalized wavelength $\lambda/\Lambda$ is calculated.

Figure 12:
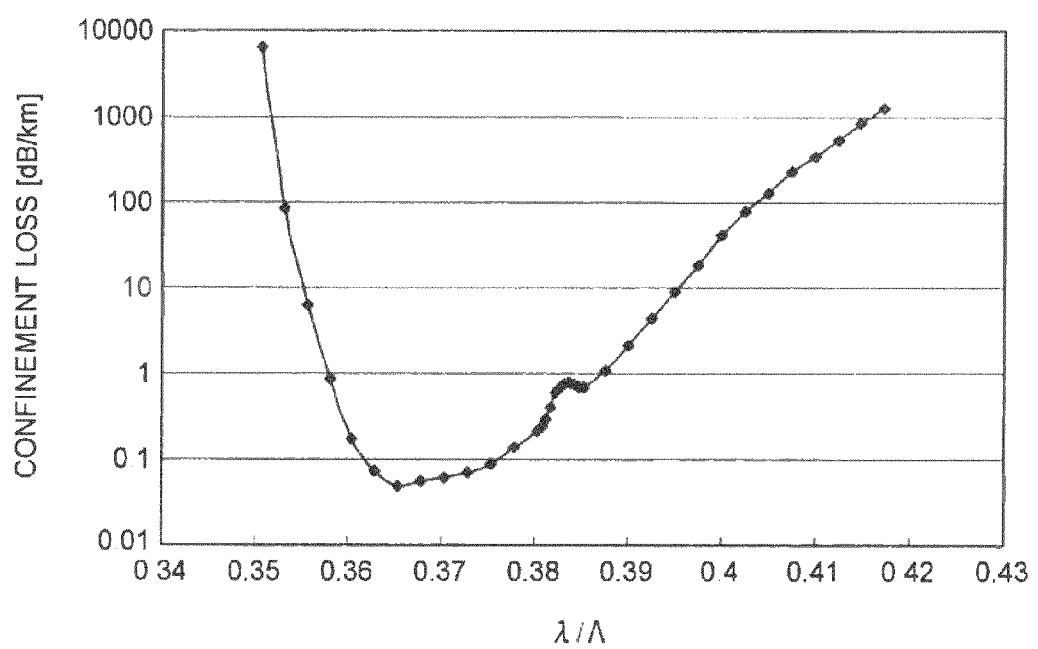
FIG. 12 is a view showing characteristics of a confinement loss to a normalized wavelength $\lambda/\Lambda$.

FIG. 12 is a view showing characteristics of the confinement loss to the normalized wavelength $\lambda/\Lambda$. In FIG. 12, the confinement loss is minimized in the vicinity of the normalized wavelength $\lambda/\Lambda$ set to 0.37.

Note that the value of 0.37 of the normalized wavelength $\lambda/\Lambda$ is a value that depends on the ratio (in particular, the limit ratio) $d_0/\Lambda_0$, which is a practical design parameter obtained by the preliminary experiment process, and a structural feature of the holes.

Distance-Between-Holes Setting Process

Next, the distance-between-holes setting process at step S103 will be explained. In the distance-between-holes setting process, a set distance-between-holes $\Lambda_1$ to a wavelength $\lambda_1$, which is a wavelength of light desired to be transmitted by the PBGF to be manufactured, is calculated from a value of the normalized wavelength $\lambda/\Lambda$ at which the confinement loss obtained by the calculation process at step S102 becomes an approximately minimum value. For example, when the value of 0.37 described above is used as the normalized wavelength $\lambda/\Lambda$, the following expression (1) is used.

$$\Lambda_1 = \lambda_1/0.37 \quad (1)$$

More specifically, when a wavelength of light, which is desired to be transmitted, that is, the wavelength $\lambda_1$ in which a photonic band gap is desired to be formed, is set, the distance-between-holes $\Lambda_1$ can be calculated using the expression (1). The transmission wavelength $\lambda_1$ can be optionally set. For example, when it is intended to set a center wavelength of a photonic band gap to 1.05 µm to use a wavelength band of about 1.0 µm (1.0 to 1.1 µm) for the optical transmission, to which an attention is increased at present for a Yb: fiber laser and the like using an optical fiber doped with ytterbium (Yb) to be applied to, the set distance-between-holes $\Lambda_1$ becomes 2.84 µm from the expression (1).

Note that if the confinement loss to the wavelength $\lambda$ is calculated using the FEM and the like each time a transmission wavelength $\lambda_1$ set for use is changed, since the calculation process must be performed from the beginning each time the transmission wavelength $\lambda_1$ is changed, a very long calculation time and a very large calculation load are required. In contrast, in the embodiment, the confinement loss to the wavelength $\lambda$, is calculated using the optionally selected distance-between-holes $\Lambda$, further the confinement loss to the normalized wavelength $\lambda/\Lambda$ is calculated, and the set distance-between-holes $\Lambda_1$ to the transmission wavelength $\lambda_1$ is calculated from the value of the normalized wavelength $\lambda/\Lambda$ at which the confinement loss becomes about the minimum value. With the operation, since it is not necessary to calculate the confinement loss each time the transmission wavelength $\lambda_1$ is changed, a calculation time and a calculation load are greatly reduced.

Drawing Process

Next, the drawing process at step S104 will be explained. In the drawing process, a manufacturing preform for manufacturing a PBGF is formed by using the same members as those of the preliminary experiment preform used at step S101, a distance-between-holes in the manufacturing preform is set to the set distance-between-holes $\Lambda_1$ calculated at step S103, and the manufacturing preform is drawn (second drawing) by the drawing equipment used to draw the preliminary experiment preform.

Specifically, the manufacturing preform is manufactured by disposing predetermined number of the capillary tubes 11, which are shown in, for example, FIG. 5, in a jacket tube in a triangular lattice pattern and extracting seven capillary tubes 11 in a central portion from the capillary tubes 11 disposed in the triangular lattice pattern. Next, a lower end of the manufacturing preform is sealed by being melted and collapsed, and the manufacturing preform is drawn using the drawing equipment 100 shown in FIG. 6. Note that a condition of a pressurization performed by the gas pressurizing equipment 101, a drawing speed, and the like are preferably set similar to those of the preliminary experiment process.

Note that when the drawing is performed, a desired set distance-between-holes $\Lambda_1$ may be realized by adjusting an outside diameter of a PBGF to be drawn. It is preferable to perform the drawing by adjusting the pressure, the drawing speed, and the like so that the distance-between-holes becomes the set distance-between-holes $\Lambda_1$ because the set distance-between-holes $\Lambda_1$ can be realized more accurately. To adjust the distance-between-holes so that it is set to the set distance-between-holes $\Lambda_1$, it is sufficient to perform the drawing by observing a cross section of the drawn PBGF by a microscope and the like, for example, at the beginning of the drawing or while the drawing is performed and measuring an offset of the distance-between-holes from the set distance-between-holes $\Lambda_1$ and setting or controlling an outside diameter of the PBGF and the pressure, the drawing speed, and the like so that the offset is corrected.

As described above, according the processes at steps S101 to S104 of the embodiment, a PBGF whose structure realizes desired optical characteristics to which the practical design parameter obtained by the preliminary experiment process is reflected can be more securely as well as more efficiently manufactured.

First Example

As a first example of the invention, to set the transmission wavelength $\lambda_1$ to 1.05 μm, a PBGF whose target d/$\Lambda$ was set to at least 0.95 or more and in particular to 0.97 and which was of a 7-cell type and had seven hole layers that surrounded a core portion was manufactured as described below.

First, as a preliminary experiment process, seven capillary tubes were prepared which were composed of pure silica glass and in which a ratio of an inside diameter of holes and a distance between adjacent holes was set to about 0.85 when the holes were disposed in a triangular lattice pattern. Then, a preliminary experiment preform was manufactured by disposing the capillary tubes in a stack tube composed of pure silica glass in the state shown in FIG. 5, and a preliminary experiment capillary body was manufactured by drawing the preliminary experiment preform by a drawing equipment with the preliminary experiment preform being pressurized. At this time, to obtain the limit ratio $d_0/\Lambda_0$, a pressurization condition was controlled so that the holes were made as large as possible. When the limit ratio $d_0/\Lambda_0$ was measured in the manufactured preliminary experiment capillary body, it was 0.97.

Next, as the calculation process, a confinement loss to the wavelength $\lambda$ in the 7-cell type PBGF having the 7-layer structure was calculated using the value of the limit ratio $d_0/\Lambda_0$ and an optionally selected distance-between-holes $\Lambda$ and further an confinement loss to the normalized wavelength $\lambda/\Lambda$ was calculated. As a result, the confinement loss was minimized when the normalized wavelength $\lambda/\Lambda$ was about 0.37. Thus, as the distance-between-holes setting process, the set distance-between-holes $\Lambda_1$ was calculated by setting $\lambda_1$ to 1.05 μm in the expression $\Lambda_1=\lambda_1/0.37$. As a result, it was found that a necessary set distance-between-holes $\Lambda_1$ was 2.84 μm.

Next, as the drawing process, a manufacturing preform was manufactured to manufacture the 7-cell type PBGF having a 7-layer structure using the same capillary tubes as those of the preliminary experiment preform, and the PBGF was manufactured by performing drawing using the same drawing equipment as that of the preliminary experiment. Note that, in the drawing, a cross section of the drawn PBGF was observed as needed using a microscope and a distance-between-holes was adjusted to correct an offset in such a manner that when the distance-between-holes was smaller than a set distance-between-holes $\Lambda_1$, an outside diameter of the PBGF was increased, whereas when the distance-between-holes was larger than the set distance-between-holes $\Lambda_1$, the outside diameter was reduced.

Figure 13:
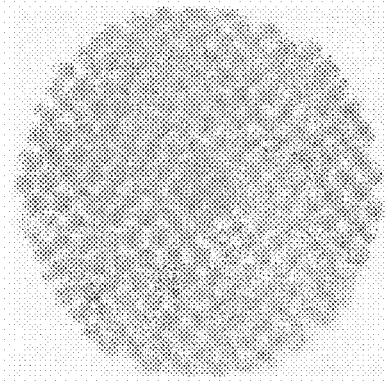
FIG. 13 is a view showing an enlarged photograph of a cross section of the photonic band gap fiber of the first example.
Figure 14:
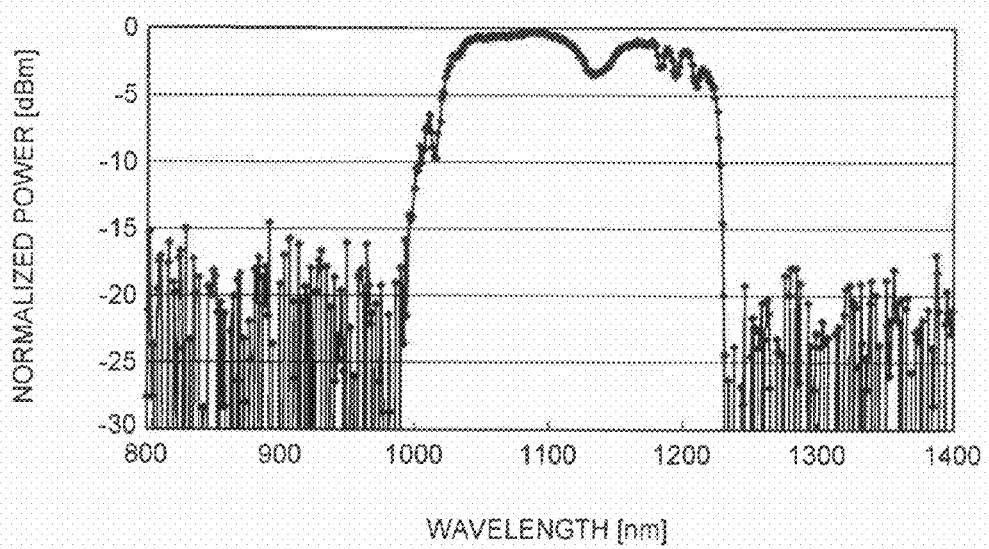
FIG. 14 is a view showing photonic band gap characteristics of the photonic band gap fiber of the first example.

Next, the manufactured PBGF will be explained. FIG. 13 is a view showing an enlarged photograph of the cross section of the PBGF of the first example. Further, FIG. 14 is a view showing photonic band gap characteristics of the PBGF of the first example. In FIG. 14, a vertical axis shows a normalized power and shows that the photonic band gap is formed in a wavelength band in which the normalized power has a large value.

As shown in FIG. 14, it is confirmed that the photonic band gap is formed in a band around a wavelength of 1050 nm, that is, in around 1.05 μm. More specifically, in the first example, a PBGF having desired photonic band gap characteristics can be manufactured by calculating the confinement loss only once using the practical design parameter obtained by the preliminary experiment.

Figure 15:
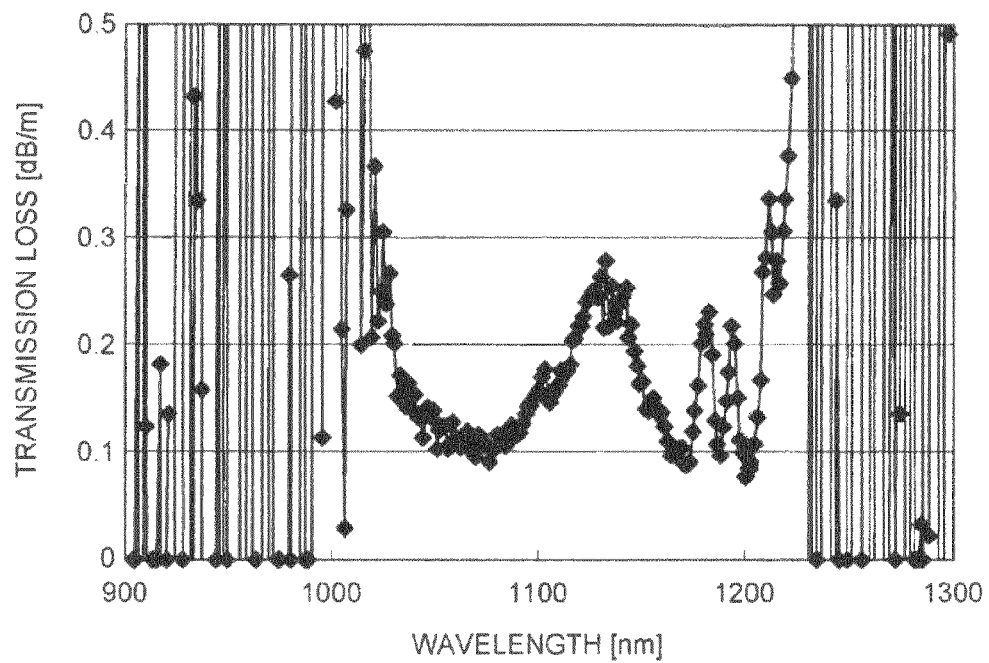
FIG. 15 is a view showing a transmission loss spectrum of the photonic band gap fiber of the first example.

Further, FIG. 15 is a view showing a transmission loss spectrum of the PBGF of the first example. As shown in FIG. 15, the PBGF of the first example has a sufficiently low transmission loss of about 0.1 dB/m in a wavelength band around about 1050 nm.

Figure 16:
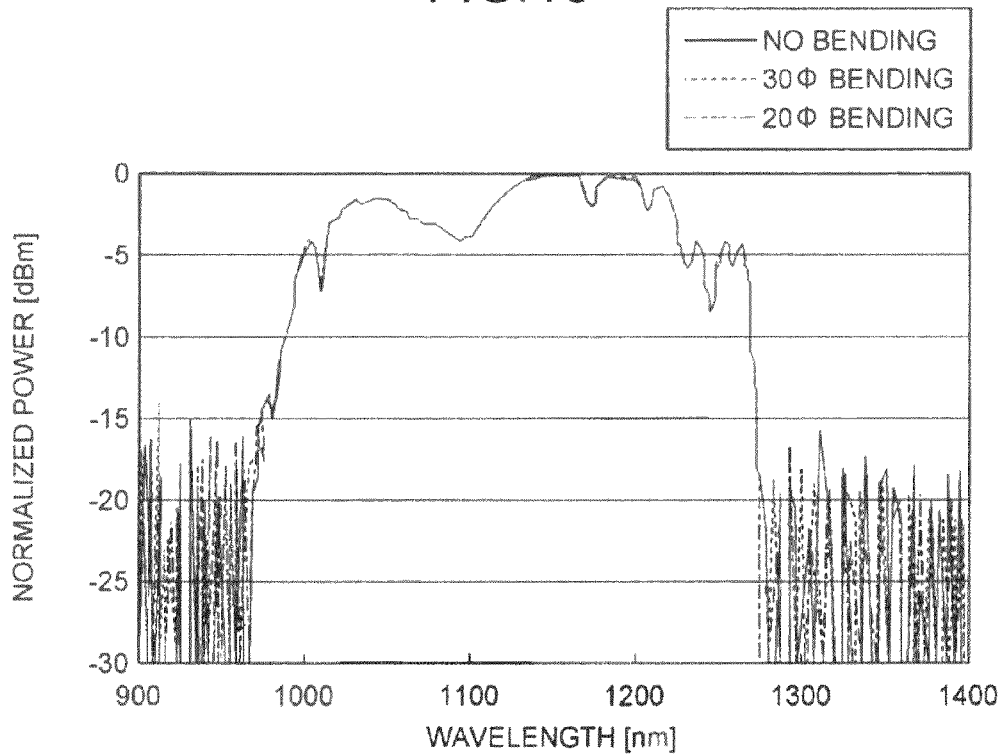
FIG. 16 is a view showing bending characteristics of the photonic band gap fiber of the first example.

Next, the bending characteristics will be explained. FIG. 16 is a view showing bending characteristics of the PBGF of the first example. Note that, in FIG. 16, a solid line shows a normalized power when the PBGF is not bent, a broken line shows a normalized power when the PBGF is bent by being wound around a 30Φ bobbin having a diameter of 30 mm only one turn, and a dash-dot-dash-line shows a normalized power when the PBGF is bent by being wound around a 20Φ bobbin only one turn.

As shown in FIG. 16, a normalized power level of the PBGF of the first example does not almost change even if it is bent to a small bending diameter of 30 mmΦ and 20 mmΦ. That is, it is confirmed that the PBGF of the first example is very stable to a disturbance such as the bending and the like. The characteristics are one of large merits of the PBGF.

Second Example

Subsequently, to set the transmission wavelength $\lambda_1$ to 1.15 μm, a PBGF whose target d/$\Lambda$ was set to 0.97 and which was of a 7-cell type and had seven hole layers that surround a core portion was manufactured as a second example of the invention. When the PBGF of the second example was manufactured, a preliminary experiment and a calculation of a confinement loss were not performed again, and a set distance-between-holes $\Lambda_1$ was calculated by setting $\lambda_1$ to 1.15 μm in $\Lambda_1=\lambda_1/0.37$ which was an expression determined using the parameter obtained in the preliminary experiment of the first example. At this time, it was found that a necessary set distance-between-holes $\Lambda_1$ is 3.03 µm.

Next, as the drawing process, a manufacturing preform was manufactured to manufacture the 7-cell type PBGF having a 7-layer structure using the same capillary tubes as those of the second example and the PBGF was manufactured by performing drawing using the same drawing equipment as that of the embodiment. Note that, in the drawing, a cross section of the drawn PBGF was observed as needed using a microscope and a distance-between-holes was adjusted to correct an offset in such a manner that when the distance-between-holes was larger than the set distance-between-hole $\Lambda_1$, a drawing speed of the PBGF was reduced, whereas when the distance-between-hole was larger than the set distance-between-holes $\Lambda_1$, the drawing speed was increased.

Figure 17:
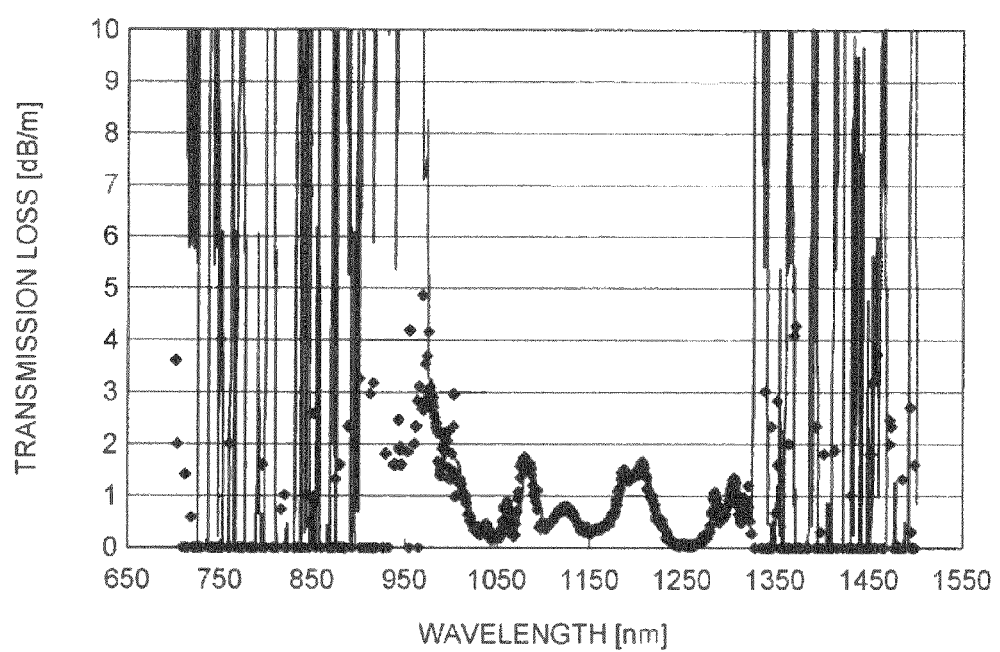
FIG. 17 is a view showing a transmission loss spectrum of a photonic band gap fiber of the second example.

Next, the manufactured PBGF will be explained. FIG. 17 is a view showing a transmission loss spectrum of the PBGF of the second example. As shown in FIG. 17, it is confirmed that the PBGF of the second example has a photonic band gap formed in a wavelength band of around about 1150 nm, a good transmission loss of about 0.3-0.6 dB/m in a low-loss wavelength band of about 1150 nm, and a transmission loss of 2 dB/m or less which has no problem also in the other wavelength band.

As described above, in the second example, the PBGF having desired photonic band gap characteristics can be manufactured using results of the preliminary experiment and the calculation of the first example without performing a time-consuming preliminary experiment and calculation again.

Note that the invention is by no means limited by the embodiment. For example, in the embodiment, although the PBGF is of the 7-cell type, the PBGF may be of a 19-cell type PBGF and a PBGF having a core portion of other structure. The disposition of the holes is not limited to the triangular lattice pattern and any disposition may be used as long as the photonic band gap can be formed by the disposition. Further, the preliminary experiment preform and the manufacturing preform of the PBGF are not limited to those manufactured by the stack & draw method, and a preform in which holes are formed using, for example, a boring method may be used.

Further, in the embodiment, although the same drawing equipment is used in the preliminary experiment process and in the drawing process, different drawing equipment may be used in each process. When the different drawing equipment is used in each process, drawing may be performed in the same drawing temperature condition in the preliminary experiment process and in the drawing process. The drawing temperature condition means a temperature in the vicinity of a preform and a temperature distribution profile in a drawing furnace.

Further, in the PBGF according to the invention, when the core diameter is twice or thrice the distance-between-holes and the ratio of the hole diameter and the distance-between-holes is 0.9 or more, and the number of the hole layers is 5 or more, the PBGF is an optical fiber whose manufacture is difficult because a structure of holes of the PBGF becomes complex and is liable to be deformed and whose design is time-consuming. However, the manufacturing method according to the embodiment is particularly effective in that the method can relatively easily realize a PBGF having the structural feature described above.

Although the invention has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A manufacturing method of a photonic band gap fiber having a core portion and a cladding portion formed around an outer periphery of the core portion and having holes disposed to form photonic crystal which causes the core portion to act as a crystal defect, the manufacturing method comprising:
   a preliminary experiment process of measuring a hole diameter $d_0$ and a distance-between-holes $\Lambda_0$ realized in a preliminary experiment capillary body which is manufactured by first drawing a preliminary experiment preform having a plurality of holes formed along a longitudinal direction;
   calculating a confinement loss to a normalized wavelength $\lambda/\Lambda$ which is obtained based on a wavelength $\lambda$ normalized by an optional distance-between-holes $\Lambda$ using a ratio $d_0/\Lambda_0$ of the hole diameter $d_0$ and the distance-between-holes $\Lambda_0$ of the measured preliminary experiment capillary body and the optional distance-between-holes $\Lambda$ as design parameters;
   setting a distance-between-holes by calculating the set distance-between-holes $\Lambda_1$ with respect to a desired transmission wavelength $\lambda_1$ of a photonic band gap fiber to be manufactured using a value of the normalized wavelength $\lambda/\Lambda$ in which the calculated confinement loss becomes about a minimum value; and
   second drawing of forming a manufacturing preform for manufacturing the photonic band gap fiber by using members made of a same material and having a same ratio of hole diameter to distance-between-holes as those of the preliminary experiment preform, and drawing the manufacturing preform by setting a distance-between-holes of the manufacturing preform to the set distance-between-holes $\Lambda_1$, in a drawing temperature condition used for the first drawing of the preliminary experiment perform, wherein
   the photonic band gap filter manufactured by the manufacturing preform includes a core portion, and
   the core portion has a shape corresponding to a polygon.

2. The manufacturing method according to claim 1, wherein
   the calculation of the distance-between-holes $\Lambda_1$ includes a structural feature of holes of the preliminary experiment capillary body in the design parameters.

3. The manufacturing method according to claim 2, wherein
   the second drawing is performed by adjusting the distance-between-holes to the set distance-between-holes $\Lambda_1$.

4. The manufacturing method according to claim 3, wherein
   in the second drawing process, an offset of a distance-between-holes in the drawn photonic band gap fiber from the set distance-between-holes $\Lambda_1$ is observed, and the second drawing is performed to correct the offset.

5. The manufacturing method according to claim 1, wherein
   the second drawing is performed by adjusting the distance-between-holes to the set distance-between-holes $\Lambda_1$.

6. The manufacturing method according to claim 5, wherein
   in the second drawing, an offset of a distance-between-holes in the drawn photonic band gap fiber from the set distance-between-holes $\Lambda_1$ is observed, and the second drawing is performed to correct the offset.

7. The manufacturing method according to claim 1, wherein the core portion is of a hexagonal shape.

8. The manufacturing method according to claim 1, wherein
the second drawing is performed such that a relationship of $d_P/\Lambda_P < d_F/\Lambda_F$ is satisfied, where $d_P$ is a hole diameter of the manufacturing preform prior to the second drawing, $\Lambda_P$ is a distance-between-holes of the manufacturing preform prior to the second drawing, $d_F$ is a hole diameter of the manufacturing preform after the second drawing, and $\Lambda_F$ is a distance-between-holes of the manufacturing preform after the second drawing.

9. The manufacturing method according to claim 1, wherein
the number of the plurality of holes forming the preliminary experiment preform is less than the number of holes of the manufacturing preform for manufacturing the photonic band gap fiber.

10. The manufacturing method according to claim 1, wherein
$d_F/\Lambda_F$ is greater than 0.9.

11. The manufacturing method according to claim 1, wherein
an internal periphery of one or more holes of the preliminary experiment capillary body manufactured in the first drawing is substantially hexagonal shaped.

12. The manufacturing method according to claim 1, wherein
an internal periphery of one or more holes of the drawn photonic band gap fiber is substantially hexagonal shaped.

* * * * *

UNITED STATES PATENT AND TRADEMARK OFFICE
CERTIFICATE OF CORRECTION

PATENT NO. : 8,554,038 B2
APPLICATION NO. : 12/980857
DATED : October 8, 2013
INVENTOR(S) : Kazunori Mukasa It is certified that error appears in the above-identified patent and that said Letters Patent is hereby corrected as shown below:

In the Specifications

Column 12, line 40, change "filter" to --fiber--.

Column 12, line 47, change "in the" to --within--.

Column 13, line 21, after "0.9" insert --, where $d_F$ is a hole diameter of the manufacturing preform after the second drawing, and $\Lambda_F$ is a distance-between-holes of the manufacturing preform after the second drawing--.

Signed and Sealed this
First Day of April, 2014

Michelle K. Lee
*Deputy Director of the United States Patent and Trademark Office*